(12) United States Patent
Milojicic et al.

(10) Patent No.: US 10,884,953 B2
(45) Date of Patent: Jan. 5, 2021

(54) CAPABILITY ENFORCEMENT PROCESSORS

(71) Applicant: HEWLETT PACKARD ENTERPRISE DEVELOPMENT LP, Houston, TX (US)

(72) Inventors: Dejan S Milojicic, Palo Alto, CA (US); Chris I Dalton, Bristol (GB); Paolo Faraboschi, Palo Alto, CA (US); Kirk M Bresniker, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/693,149

(22) Filed: Aug. 31, 2017

(65) Prior Publication Data

US 2019/0065408 A1 Feb. 28, 2019

(51) Int. Cl.
*G06F 12/14* (2006.01)

(52) U.S. Cl.
CPC ...... *G06F 12/1466* (2013.01); *G06F 12/1483* (2013.01); *G06F 2212/1052* (2013.01)

(58) Field of Classification Search
CPC ......... G06F 12/1466; G06F 2212/1052; G06F 3/0622; G06F 3/0637; G06F 3/067; G06F 12/1483; G06F 12/1458
See application file for complete search history.

(56) References Cited

U.S. PATENT DOCUMENTS

| | | | |
|---|---|---|---|
| 8,561,037 B2 | 10/2013 | Wallach et al. | |
| 8,793,686 B2 | 7/2014 | Aasheim | |
| 2006/0179273 A1 | 8/2006 | Cole et al. | |
| 2011/0296117 A1* | 12/2011 | Fukuda | G06F 12/1483 711/154 |
| 2012/0159518 A1* | 6/2012 | Boliek | G06F 9/4843 719/318 |
| 2016/0077852 A1 | 3/2016 | Kissell | |
| 2016/0283402 A1* | 9/2016 | Schulz | G06F 12/145 |
| 2017/0063615 A1 | 3/2017 | Yang et al. | |
| 2017/0371663 A1 | 12/2017 | Milojicic et al. | |
| 2018/0063158 A1 | 3/2018 | Dalton et al. | |

(Continued)

OTHER PUBLICATIONS

Watson et al; Capability Hardware Enhanced RISC Instructions: CHERI Instruction-set architecture Technical Report #850 [online], Apr. 2014 [Retrieved on Aug. 17, 2018]. Retrieved from the Internet <URL: https://www.cl.cam.ac.uk/techreports/UCAM-CL-TR-850.pdf> <ISSN 1476-2986> (Year: 2014).*

(Continued)

*Primary Examiner* — David Yi
*Assistant Examiner* — Dustin B. Fulford
(74) *Attorney, Agent, or Firm* — Hewlett Packard Enterprise Patent Department

(57) ABSTRACT

Example implementations relate to a capability enforcement processor. In an example, a capability enforcement processor may be interposed between a memory that stores data accessible via capabilities and a system processor that executes processes. The capability enforcement processor intercepts a memory request from the system processor and enforces the memory request based on capability enforcement processor capabilities maintained in per-process capability spaces of the capability enforcement processor.

15 Claims, 5 Drawing Sheets

(56) References Cited

U.S. PATENT DOCUMENTS

2018/0114011 A1 4/2018 Dalton et al.
2019/0129864 A1 5/2019 Faraboschi

OTHER PUBLICATIONS

Neumann et al; Modular Research-Based Composably Trustworthy Mission-Oriented Resilient Clouds (MRC2) Final Technical Report [online], Feb. 2016 [retrieved on Aug. 17, 2018]. Retrieved from the Internet <URL:http://www.dtic.mil/dtic/tr/fulltext/u2/1005641.pdf> (Year: 2016).*

MIPS Technologies; "MIPS64® Architecture for Programmers vol. II: The MIPS64® Instruction Set" [online], Jul. 1, 2005. [retrieved on Feb. 6, 2019]. Retrieved from the Internet <URL:https://scc.ustc.edu.cn/zlsc/lxwycj/200910/W020100308600769158777.pdf> (Year: 2005).*

Levy, Henry "Capability Based Computer Systems" Original print publication Digital Press 1984, now [online]. [retrieved on Nov. 12, 2019]. Retrieved from the Internet <URL:https://book.huihoo.com/pdf/capability-based-computer-systems/> (Year: 1984).*

Peter G. Neumann et al., "Modular Research-based Composably Trustworthy Mission-oriented Resilient Clouds," Oct. 30, 2012, pp. 1-59, SRI International and University of Cambridge.

* cited by examiner

CAPABILITY ENFORCEMENT PROCESSORS

BACKGROUND

A computing system may employ capabilities or unforgeable tokens of authority to address data in memory and protect access to that data. For example, the content of a capability may include a base address and a length to refer or point to a portion of memory where the data is located. A capability may also include metadata that specifies other parameters of the data access, such as permissions (e.g., allowance of read, write operations). Validity of a capability may be indicated by a capability tag associated with the capability.

Support for capabilities may be implemented in processor architecture (i.e., architecture of a central processing unit, or CPU), memory architecture, instruction set architecture (ISA), or operating system design. For example, capabilities may be loaded into capability registers, and may be dereferenced, manipulated, or otherwise accessed solely through privileged instructions of a capability-supporting CPU architecture or operating system. However, implementing or influencing architectural changes to support capabilities may be difficult. Also, operating system-based approaches may bear undesirable overhead upon processing each memory operation.

BRIEF DESCRIPTION OF THE DRAWINGS

Various examples will be described below with reference to the following figures.

Figure 1:
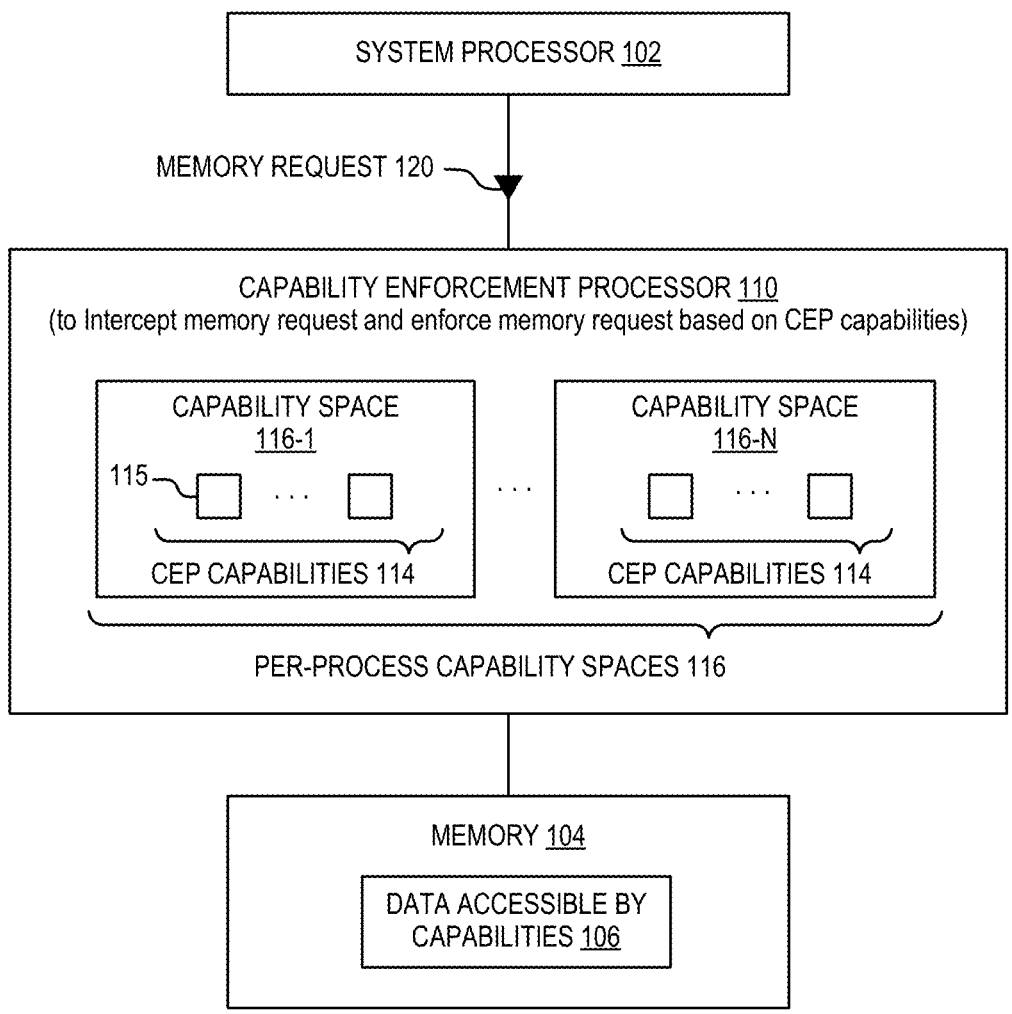
FIG. 1 is a block diagram depicting an example system that includes a capability enforcement processor.

Throughout the drawings, identical reference numbers may designate similar, but not necessarily identical, elements. Use herein of a reference numeral without a hyphenated index number, where such reference numeral is referred to elsewhere with a hyphenated index number, may be a general reference to the corresponding plural elements, collectively or individually.

DETAILED DESCRIPTION

Examples disclosed herein may relate to, among other things, a capability enforcement processor interposed between a system processor and memory storing data accessible via capabilities. The capability enforcement processor may intercept memory requests from the system processor, and enforce those memory requests based on the capability enforcement processor (CEP) capabilities maintained in a per-process capability space of the capability enforcement processor.

By virtue of implementing a capability enforcement processor as described herein, a system may support capabilities and gain attendant benefits such as data security without reliance on CPU architectural changes or incurring operating system overhead. In some examples, a capability enforcement processor may provide capability functionality in a system where the CPUs do not support capabilities. Additional useful aspects of the systems and methods of the present disclosure will become apparent and will be described further herein below.

Referring now to the figures, FIG. 1 is a block diagram depicting an example system 100 that includes a capability enforcement processor 110. In some examples, the system 100 may serve as or form part of a computing system, such as a server, an information technology appliance, a workstation, etc.

The system 100 includes a system processor 102, a memory 104, and a capability enforcement processor 110 interposed between the memory 104 and the system processor 102. More particularly, in some implementations, the capability enforcement processor 110 may be closely coupled to the memory 104. The system processor 102 may be or include a CPU in some implementations. The system processor 102 may also be or include other types of processing resource, such as a microcontroller, a microprocessor, an application-specific integrated circuit (ASIC), a field programmable gate array (FPGA), etc. The system processor 102 may run a hypervisor, run an operating system, execute processes (i.e., applications), and/or carry out other computational tasks.

In some implementations, the system processor 102 may be deemed local to the memory 104. In other implementations, the system processor 102 may be remote to the memory 104. Remoteness of the system processor 102 may be defined in terms of access latency, for example.

The memory 104 may be volatile memory or non-volatile memory. Non-volatile memory stores information non-volatilely, meaning that the information persists even after power is removed from the memory, while volatile memory stores information volatilely, meaning that the information is lost when power is removed from the memory. Examples of volatile memory may include dynamic random access memory (DRAM), static random access memory (SRAM), etc. Examples of non-volatile memory may include flash memory, phase-change memory, spin-transfer torque memory, resistive random-access memory, memristive memory, etc. The memory 104 may store data 106 that is accessible via capabilities. In some instances, master capabilities for accessing the data 106 may be stored in a tagged architecture portion of memory 104.

The capability enforcement processor 110 may include dedicated hardware, circuitry, a processor executing machine readable instructions, or any combination of the foregoing, to implement the functionality described herein below. For example, the capability enforcement processor 110 may be or include a coprocessor, a microcontroller, a microprocessor, one or more cores of a multi-core processor, an ASIC, an FPGA, etc. In some implementations, the capability enforcement processor 110 may be separate from the system processor 102, and may be understood to supplement the functionality of the system processor 102 with the capabilities-related functionality described below.

The capability enforcement processor 110, being situated between the system processor 102 and the memory 104, can intercept a memory request 120 from the system processor 102. For example, each process executing on the system processor 102 may be allocated a virtual address space that maps to physical address space of the memory 104. A process may address a virtual address in its allocated virtual address space, which is translated to a physical address (e.g., by a memory management unit, or MMU) included with the memory request 120. Thus, the memory request 120 may be specific to a process and the associated virtual address space.

The capability enforcement processor 110 may maintain or hold capability enforcement processor capabilities 114 (also referred to herein as CEP capabilities) in per-process capability spaces 116 (e.g., 116-1 through 116-N). The CEP capabilities 114 may be copies of master capabilities (e.g., stored in tagged memory of memory 104 or other memory not shown) or may be pointers to those master capabilities. Establishing the CEP capabilities 114 on the capability enforcement processor 110 in a first instance will be described further herein below. The per-process capability spaces 116 refer to CEP capabilities 114 being identifiable by processes executing on the system processor 102. For example, a first process executing on the system processor 102 and the virtual address space allocated to that first process may be associated with a first per-process capability space 116-1, while a second process executing on the system processor 102 and the virtual address space allocated to that second process may be associated with a second per-process capability space 116-N. In some implementations, each per-process capability space 116 may be identified or referred to by a context identifier or the like that relates to a particular process, operating system, node, or other granularity of the system 100. The CEP capabilities 114 may be held in registers, a cache, or other hardware-based element of the capability enforcement processor 110.

The capability enforcement processor 110 enforces the intercepted memory request 120 based on the CEP capabilities 114 maintained in the per-process capability spaces 116. In some implementations, the capability enforcement processor 110 enforces the memory request 120 by comparing the memory request 120 against the CEP capabilities 114 to determine if the memory request 120 matches a valid CEP capability (e.g. 115, for illustration purposes) from among the CEP capabilities 114 and if the memory request 120 complies with permissions of the valid CEP capability 115. For example, a memory request 120 matches a valid CEP capability 115 if the content of the memory request 120 (e.g., the memory pointer) is the same as that of one of the CEP capabilities 114 and that matched CEP capability 114 has a tag signifying its nature as a capability. A memory request 120 complies with permissions if the memory request 120 does not enlarge the scope of what is permitted and specified by the valid CEP capability 115 (e.g., read or write permissions, and memory range).

In some implementations, the capability enforcement processor 110 may determine which per-process capability space of the per-process capability spaces 116 to use for enforcement against the intercepted memory request 120 based on a related context identifier sent by the system processor 102 or other capable elements, such as a hypervisor or operating system executing on the system processor 102, if present. Such a determination may also be referred to as context switching. For example, the system processor 102 may send a context identifier with each memory request 120 when the context changes. The context identifier may reflect which process, operating system, node, etc. of the system processor 102 issued the memory request 120. After using a context identifier to identify the relevant per-process capability space (e.g., 116-1 for illustration purposes), the capability enforcement processor 110 then enforces the memory request 120 against the CEP capabilities 114 of the determined per-process capability space (e.g., 116-1).

The capability enforcement processor 110 may respond to a determination that the memory request 120 both matches a valid CEP capability 115 and complies with permissions of the valid CEP capability 115, by permitting the memory request 120 via the valid CEP capability 115. For example, in some cases, the capability enforcement processor 110 may permit the memory request 120 by reading the memory 104 using the valid CEP capability 115 and according to the memory range specified by the intercepted memory request 120 and may return the read data to the system processor 102. In some cases, the capability enforcement processor may write to the memory 104, according to the payload of the memory request 120, using the valid CEP capability 115.

In some instances of enforcement against a memory request 120, the capability enforcement processor 110 may determine that the memory request 120 relates to a capability that is not maintained by the capability enforcement processor 110 but does address the memory 104. For example, the memory request 120 may match a master capability stored in the memory 104. The capability enforcement processor 110 may respond in such cases by copying that related master capability from the memory 104 in to a per-process capability space 116 (based on a context identifier, if provided) as a CEP capability 114, to establish the CEP capability 114 in a first instance. Alternatively or additionally, the capability enforcement processor 110 may establish a CEP capability 114 that points to the related memory capability in the memory 104. Subsequent memory requests may then be enforced against a corresponding CEP capability 114 by the capability enforcement processor 110.

In some implementations, the capability enforcement processor 110 may encrypt data being written to the memory 104 by a memory request 120 using a key that is bound to the valid CEP capability 115 corresponding to the memory request 120. The capability enforcement processor 110 also may decrypt data accessed by a memory request 120 using the key bound to the valid CEP capability 115 corresponding to the memory request 120. For example, an encryption algorithm such as AES-XTS may be used where memory 104 is persistent, non-volatile memory. A key management system, such as an out-of-band processor or an in-band system, may maintain the association between CEP capabilities 114 and corresponding keys. By virtue of such encryption, access to an encrypted location of memory 104 without going through the capability enforcement processor 110 would result in encrypted data being read back.

In some implementations, the system 100 may include a trusted security base. The trusted security base may be constructed around the capability enforcement processor 110 (e.g., at a system processor-side interface with the capability enforcement processor 110), in order to control or restrict access to a management interface of the capability enforcement processor 110. For example, the trusted security base may be an out-of-band interface, a secure enclave of the system processor 102, hypervisor extensions, operating system controls, or other security mechanisms. In some implementations, any commands to program the capability enforcement processor 110 would first be validated by the trusted security base. The trusted security base may be used in some implementations to program the capability enforcement processor 110 with an initial capability to partition the memory 104. Other management operations that may involve validation by the trusted security base include commands to flush some or all of the CEP capabilities 114, context switching, storing encryption keys or binding keys to CEP capabilities 114, or other capability management functions.

By virtue of the foregoing, even where an instruction set architecture of the system processor 102 does not include capability-specific support, the system 100 may nevertheless employ capabilities by virtue of the capability enforcement processor 110.

Figure 2:
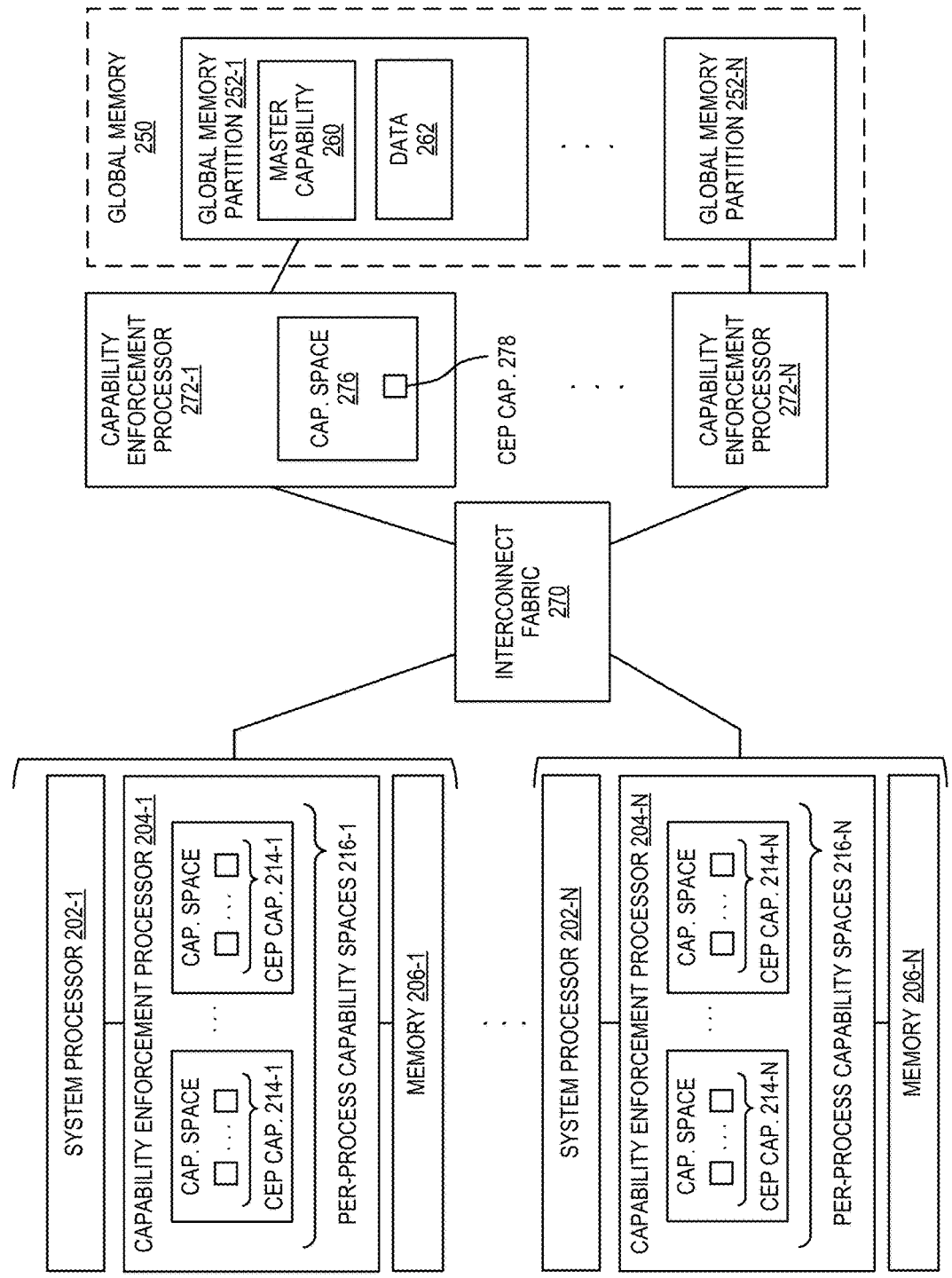
FIG. 2 is a block diagram depicting an example system that includes a plurality of capability enforcement processors.

FIG. 2 is a block diagram depicting an example system 200. The system 200 includes a plurality of capability enforcement processors 204-1 through 204-N and 272-1 through 272-N that are similar in many respects to the capability enforcement processor 110 described above. The system 200 includes a plurality of arrangements such as a capability enforcement processor 204-1 interposed between and coupled to a memory 206-1 and a system processor 202-1. Another such arrangement may include a capability enforcement processor 204-N interposed between and coupled to a memory 206-N and a system processor 202-N. The system processors 202-1 through 202-N may be analogous in many respects to the system processor 102 described above. The memories 206-1 through 206-N may be analogous in many respects to the memory 104 described above, and in some implementations, may be volatile DRAM for example.

The system 200 also may include a plurality of global memory partitions 252-1 through 252-N. A global memory partition may be a non-volatile memory device. Each global memory partition 252-1 through 252-N may be associated with and coupled to a respective capability enforcement processor 272-1 through 272-N (e.g., capability enforcement processor 272-1 is paired with global memory partition 252-1, capability enforcement processor 272-N is paired with global memory partition 252-N).

Collectively, the global memory partitions 252 may be understood to serve as or form a global memory 250 accessible to the system processors 202-1 through 202-N. In other words, a global memory 250 may include a plurality of partitions 252. The quantity of global memory partitions 252 and associated capability enforcement processors 272 may be a function of scale of the system 200. For example, for each system processor like 202-1 included in the system 200, a global memory partition like 252-1 and associated capability enforcement processor like 272-1 may be added to the system 200.

The global memory 250 (and more particularly, a global memory partition 252-1 for example) may store data 262 accessible via master capability 260. For example, the data 262 may be analogous in many respects to the data 106 of FIG. 1. The master capability 260 may be stored in a tagged architecture portion of the global memory partition 252-1 and the data 262 may be stored in an untagged portion of the global memory partition 252-1. Similarly, memories 206-1 through 206-N also may store data and master capabilities for accessing that data (not shown).

An interconnect fabric 270 communicatively couples many of the components of the system 200 to each other, including at least the capability enforcement processors 204-1 through 204-N and 272-1 through 272-N. A system processor may be deemed local to a memory within the same arrangement (e.g., system processor 202-1 is local to the memory 206-1 and the capability enforcement processor 204-1), and a system processor may be deemed remote to any memory that is reached via the interconnect fabric 270 (e.g., system processor 202-1 is remote to the memory 206-N and the capability enforcement processor 204-N, as well as the global memory partitions 252-1 through 252-N and the associated capability enforcement processors 272-1 through 272-N).

Each of the capability enforcement processors 204-1 through 204-N and 272-1 through 272-N may intercept and enforce memory requests from system processors against capability-accessed data stored on the memory to which the respective capability enforcement processor is coupled and/or associated, in a manner described above with respect to the capability enforcement processor 110 (i.e., checking if the memory request matches a valid CEP capability and complies with permissions of the valid CEP capability). For example, the capability enforcement processors 204-1 through 204-N may intercept memory requests addressing the memories 206-1 through 206-N respectively, and the capability enforcement processors 272-1 through 272-N may intercept and enforce memory requests addressing the global memory partitions 252-1 through 252-N respectively.

For this purpose, each of the capability enforcement processors may maintain CEP capabilities in per-process capability spaces that are copies of or pointers to master capabilities in the memory associated with or coupled to the respective capability enforcement processor. The CEP capabilities may reference data or another capability in an associated memory. For example, as illustrated in FIG. 2, capability enforcement processors 204-1, 204-N, 272-1 hold, in per-process capability spaces 216-1, 216-N, 276 respectively, CEP capabilities 214-1, 214-N, 278 respectively, which are copies of or pointers to master capabilities in memories 206-1, 206-N, 252-1 respectively. Per-process capability spaces and CEP capabilities of FIG. 2 may be analogous in many respects to per-process capability spaces 116 and CEP capabilities 114 described above. In some implementations, per-process capability spaces may be logical constructs on hardware such as registers, cache, memory, etc.

A memory request may be forwarded for enforcement to the capability enforcement processor that is associated with or coupled to the memory addressed by the memory request, particularly if the system processor issuing the memory request is remote to the memory addressed by the memory request and remote to the capability enforcement processor associated with that memory. For example, the capability enforcement processor 204-1 may intercept a memory request from the system processor 202-1 and determine whether the memory request relates to a capability that is not maintained by the capability enforcement processor 204-1 but addresses a memory to which the system processor 202-1 is remote, such as the memory 206-N or the global memory partition 252-1. Responsive to that determination, the capability enforcement processor 204-1 may pass the memory request to be handled and enforced by the capability enforcement processor associated with that memory, such as the capability enforcement processor 204-N if the memory request addresses memory 206-N or the capability enforcement processor 272-1 if the memory request addresses global memory partition 252-1.

For example, if the memory request is forwarded to the capability enforcement processor 272-1, the capability enforcement processor 272-1 may determine that the memory request matches a valid CEP capability 278 in a per-process capability space 276 (among other CEP capabilities and per-process capability spaces not shown) and that the memory request complies with permissions of the CEP capability 278. The capability enforcement processor 272-1 may execute the memory request (read or write) using the CEP capability 278 to access the data 262 directly or via the master capability 260.

Other aspects described above with respect to the capability enforcement processor 110, such as inclusion of a trusted security base, encryption/decryption, context switching, etc., may also apply to the capability enforcement processors 204-1 through 204-N, 272-1 through 272-N, when processing memory requests from both remote and local system processors.

In some implementations, a capability enforcement processor 204-1 through 204-N or 272-1 through 272-N, may exclusively enforce memory requests against a specific address range of an associated memory. For example, such a specific address range may be a part of an address space that is mapped remotely (e.g., a limited range in the global memory 250); a part of an address space that is shared between nodes and/or processes; or other address ranges. Exclusively enforcing memory requests against a specific address range (as opposed to the entire address space) may be useful for increasing the performance of a capability enforcement processor.

Figure 3:
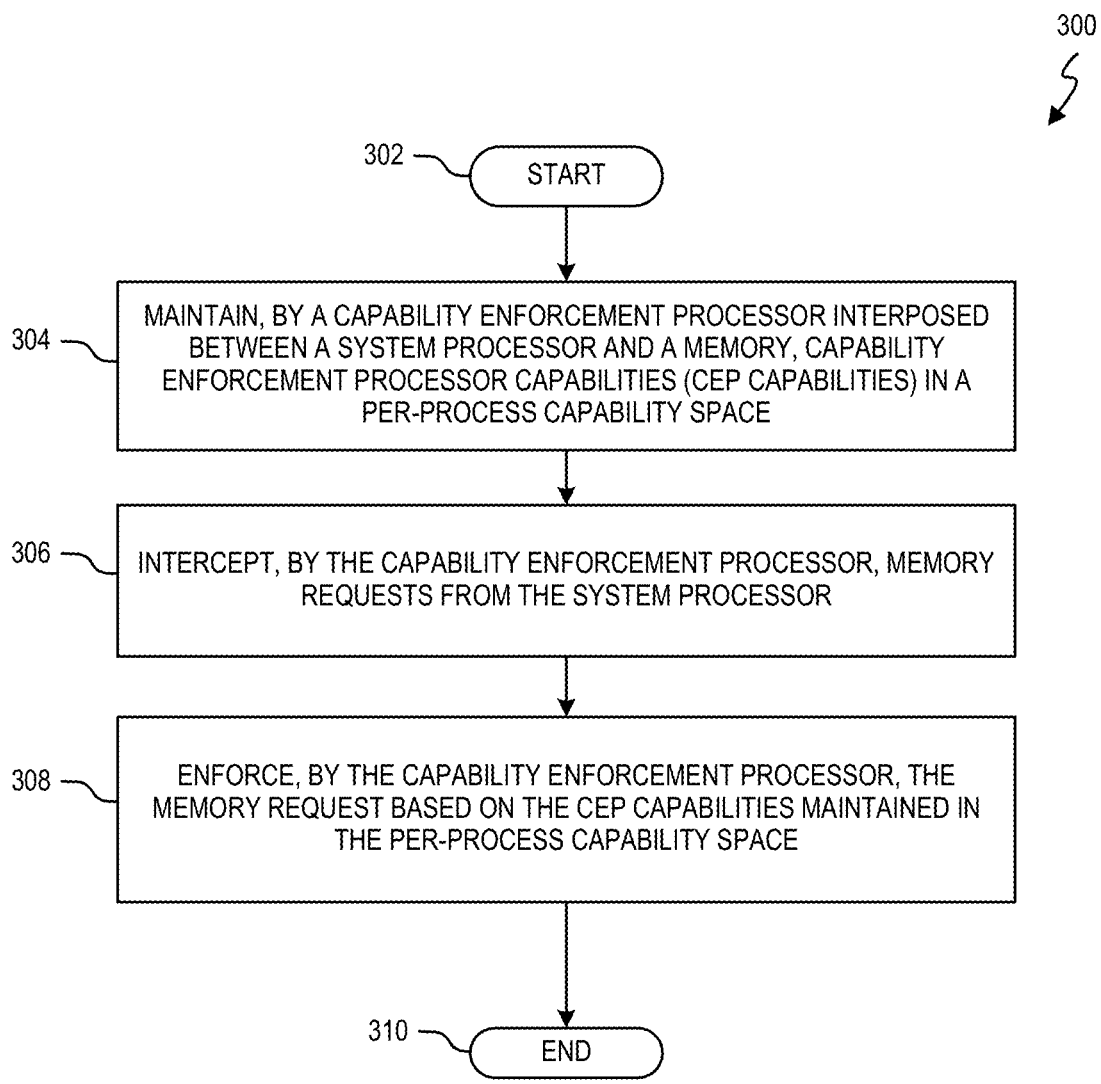
FIG. 3 is a flow diagram depicting an example method that employs a capability enforcement processor.
Figure 4:
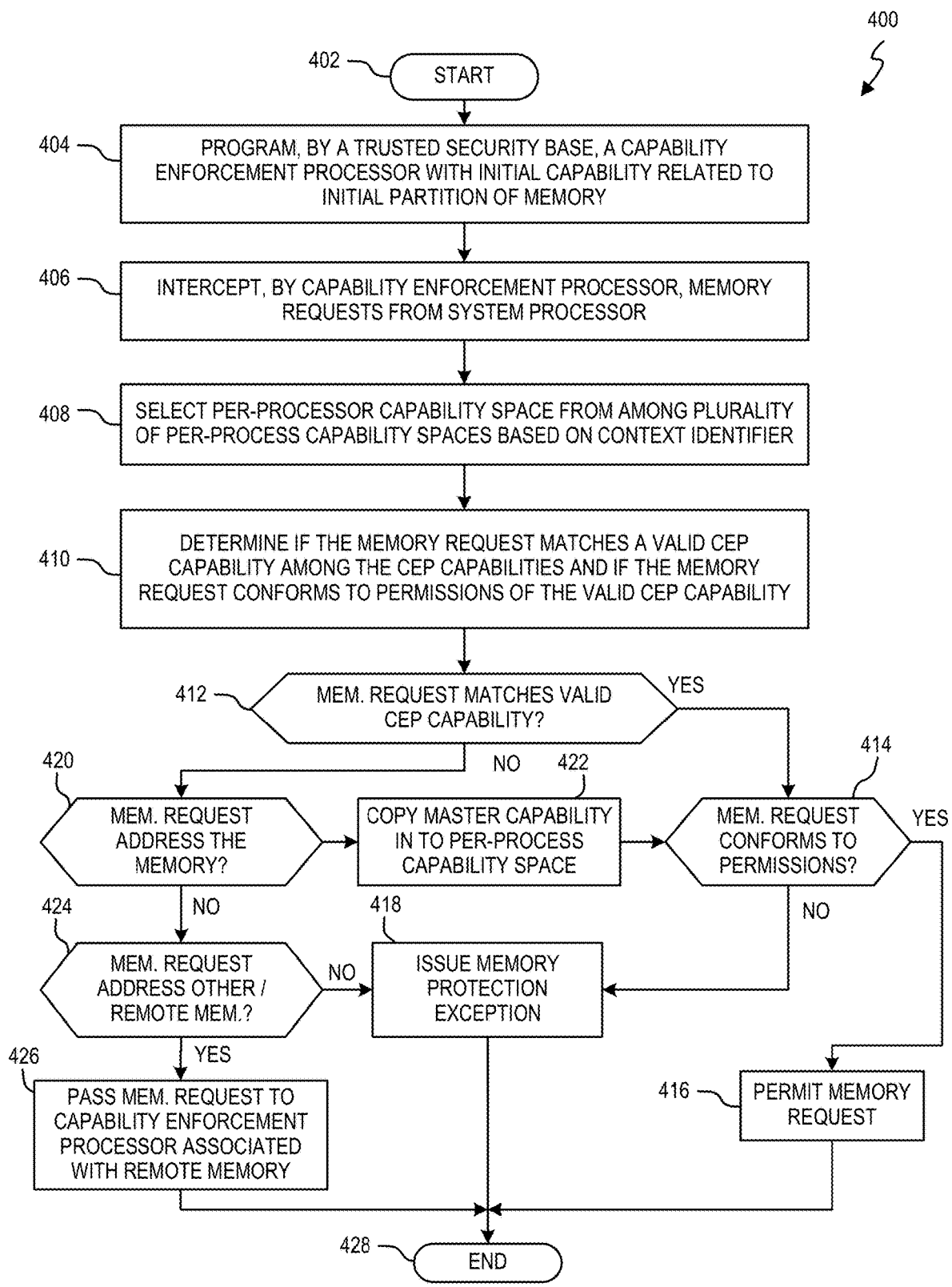
FIG. 4 is a flow diagram depicting another example method that employs a capability enforcement processor.

FIGS. 3 and 4 are flow diagrams depicting various example methods. In some implementations, one or more blocks of a method may be executed substantially concurrently or in a different order than shown. In some implementations, a method may include more or fewer blocks than are shown. In some implementations, one or more of the blocks of a method may, at certain times, be ongoing and/or may repeat.

The methods may be implemented in the form of executable instructions stored on a machine readable medium and executed by a processing resource and/or in the form of electronic circuitry. For example, the methods below are described as being performed in part or in whole by a capability enforcement processor, such as the capability enforcement processors 110, 204-1, or 272-1 described above, and may operate within the context of a system like system 100 or 200. The capability enforcement processor may be coupled to a memory, and may be interposed between a system processor and a memory. As described above, the capability enforcement processors may include hardware, such as registers, a cache, memory, etc. to hold CEP capabilities. Each CEP capability may belong to a process-specific (i.e., per-process) capability space. A CEP capability may point to data in the memory or to a master capability for accessing that data.

FIG. 3 is a flow diagram depicting an example method 300 that employs a capability enforcement processor. Method 300 begins at block 302 and continues to block 304, where the capability enforcement processor maintains CEP capabilities in a per-process capability space. At block 306, the capability enforcement processor intercepts memory requests from a system processor. At block 308, the capability enforcement processor enforces the memory request based on the CEP capabilities maintained in the per-process capability space. Method 300 ends at block 310.

FIG. 4 is a flow diagram depicting an example method 400 that employs a capability enforcement processor. Method 400 begins at block 402 and continues to block 404, where the capability enforcement processor is programmed, by a trusted security base, with an initial CEP capability related to an initial partitioning of the memory. Subsequent memory operations may, for example, allocate portions of the initial memory partitioning and create new associated capabilities.

At block 406, the capability enforcement processor intercepts memory requests from a system processor. At block 408, the capability enforcement processor may select a per-process capability space from among a plurality of per-process capability spaces present at the capability enforcement processor based on a related context identifier from the system processor (or a hypervisor, operating system, etc. executing on the system processor). The context identifier may accompany the intercepted memory request or may be received from the system processor separately.

At block 410, the capability enforcement processor determines if the memory request intercepted at block 406 matches a valid CEP capability among CEP capabilities maintained in the per-process capability space selected at block 408. For example, the capability enforcement processor may compare a memory address included in the memory request against memory addresses included in CEP capabilities in the per-process capability space. The capability enforcement processor also determines if the memory request complies with permissions of a matched valid CEP capability, such as memory range and permitted read/write operations.

If the memory request matches a valid CEP capability in the per-process capability space ("YES" at block 412) and the memory request complies with permissions of the valid CEP capability ("YES" at block 414), method 400 proceeds to block 416, where the capability enforcement processor permits the memory request. For example, the capability enforcement processor may permit the memory request by using the valid CEP capability to carrying out a read of or write to the memory range as specified by the memory request and return results to the requesting process executing on the system processor. After block 416, method 400 ends at block 428.

Returning to after block 410, if the memory request matches a valid CEP capability in the per-process capability space ("YES" at block 412) and the memory request does not comply with permissions of the valid CEP capability ("NO" at block 414), method 400 proceeds to block 418 where the capability enforcement processor issues a memory protection exception to the requesting process executing on the system processor. A memory request may fail to comply if it is broader than the permissions of the valid CEP capability. For example, the operation (read or write) may not be permitted by the valid CEP capability, or the memory request may be attempting to reference a memory range larger than what is permitted by the valid CEP capability. After block 418, the method 400 ends at block 428.

Returning to after block 410, if the memory request does not match a valid CEP capability maintained by the capability enforcement processor ("NO" at block 412), the capability enforcement processor determines whether the memory request addresses the memory to which the capability enforcement processor is coupled. For example with reference to the system 200 of FIG. 2, a memory request from the system processor 202-1 intercepted by the capability enforcement processor 204-1 addresses the memory to which the capability enforcement processor 204-1 is coupled if the memory request addresses memory 206-1. In that example, the memory request from the system processor 202-1 does not address the memory coupled to the capability enforcement processor 204-1 if, for example, the memory request addresses memory 206-N or any of global memory partitions 252-1 through 252-N.

If the memory request addresses the memory coupled to the capability enforcement processor ("YES" at block 420), method 400 proceeds to block 422 where the capability enforcement processor copies a related master capability from the memory in to the per-process capability space (selected at block 408) as a CEP capability. In this manner, subsequent memory requests can utilize the CEP capability copied at block 422. After block 422, method 400 proceeds to block 414 as described above.

If the memory request does not address the memory coupled to the capability enforcement processor ("NO" at block 420) and does not address other memory of the system such as remote memory ("NO" at block 424), method 400 proceeds to block 418 to issue a memory protection exception. If the memory request does not address the memory coupled to the capability enforcement processor ("NO" at block 420) but does address another memory of the system such as a memory to which the requesting system processor is remote ("YES" at block 424), method 400 proceeds to block 426.

At block 426, the capability enforcement processor passes the memory request to be handled by a capability enforcement processor associated with and coupled to the memory addressed by the memory request (i.e., the memory to which the system processor is remote). That capability enforcement processor coupled to the memory addressed by the memory request may then itself perform method 400 to enforce the memory request against CEP capabilities it is holding. For example with reference to FIG. 2, the capability enforcement processor 204-1 may pass a memory request from the system processor 202-1 that references a memory address of the global memory partition 252-1 to the capability enforcement processor 272-1 via the interconnect fabric 270. The capability enforcement processor 272-1 may then determine that the memory request matches CEP capability 278 and complies with associated permissions and carry out that memory request using the CEP capability 278 to access either data 262 directly or via the master capability 260. After block 426, method 400 ends at block 428. In some implementations, at least parts of blocks 412, 414, 416, 418, 420, 422, 424, 426 may be useful for implementing block 308 of method 300.

Figure 5:
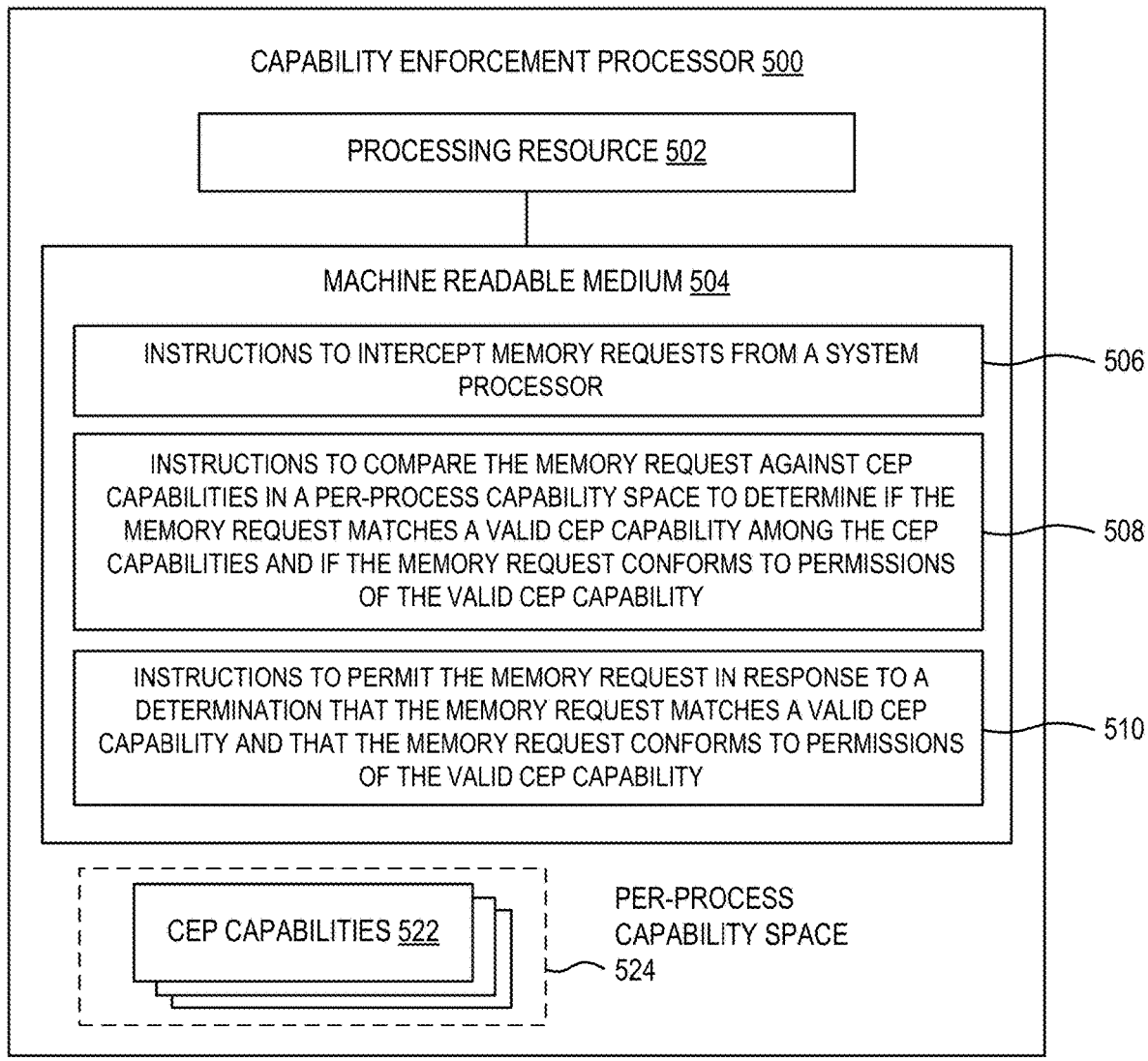
FIG. 5 is a block diagram of an example capability enforcement processor that includes a non-transitory, machine readable medium encoded with example instructions.

FIG. 5 is a block diagram of an example capability enforcement processor 500 that includes a processing resource 502 coupled to a non-transitory, machine readable medium 504 encoded with example instructions. The processing resource 502 may include a microcontroller, a microprocessor, central processing unit core(s), an ASIC, an FPGA, and/or other hardware device suitable for retrieval and/or execution of instructions from the machine readable medium 504 to perform functions related to various examples. Additionally or alternatively, the processing resource 502 may include electronic circuitry for performing the functionality of the instructions described herein.

The machine readable medium 504 may be any medium suitable for storing executable instructions, such as RAM, ROM, EEPROM, flash memory, a hard disk drive, an optical disc, or the like. The machine readable medium 504 may be disposed within the capability enforcement processor 500, as shown in FIG. 5, in which case the executable instructions may be deemed "installed" on or "embedded" in the capability enforcement processor 500. Alternatively, the machine readable medium 504 may be a portable (e.g., external) storage medium, and may be part of an "installation package."

As described further herein below, the machine readable medium 504 may be encoded with a set of executable instructions 506, 508, 510. It should be understood that part or all of the executable instructions and/or electronic circuits included within one box may, in alternate implementations, be included in a different box shown in the figures or in a different box not shown.

Instructions 506, upon execution, cause the processing resource 502 to intercept memory requests from a system processor. In some implementations, the system processor may be external to the capability enforcement processor 500. For example, instructions 506 may be useful for performing blocks 306 or 406 described above.

Instructions 508, upon execution, cause the processing resource 502 to compare the memory request against CEP capabilities 522 in a per-process capability space 524 of the capability enforcement processor 500 to determine if the memory request matches a valid CEP capability among the CEP capabilities 522 and if the memory request complies with permissions of the valid CEP capability. For example, instructions 508 may be useful for performing blocks 410, 412, 414 described above. Instructions 508 may also determine whether the memory request addresses the memory coupled to the capability enforcement processor 500 or a memory that is not coupled to the capability enforcement processor 500 but is addressable by and/or remote to the system processor that issued the memory request.

Instructions 510, upon execution, cause the processing resource 502 to permit the memory request in response to a determination by instructions 508 that the memory request matches a valid CEP capability and that the memory request complies with permissions of the valid CEP capability. For example, instructions 510 may be useful for performing block 416 of method 400.

In some implementations, the machine readable medium 504 may include additional instructions, which may be useful for performing aspects of methods 300 or 400 or aspects of the capability enforcement processors described above with respect to FIGS. 1 and 2. For example, the machine readable medium 504 also may include instructions to respond to a determination (e.g., by instructions 508), that the memory request relates to a capability that is not maintained by the capability enforcement processor 500 by copying a related master capability from the memory coupled to the capability enforcement processor 500 in to the per-process capability space 524 as a CEP capability 522. Such instructions may be useful for performing blocks 420, 422 of method 400.

As another example, the machine readable medium 504 also may include instructions to encrypt data being written to the memory by a memory request using a key bound to the valid CEP capability 522 matched by that memory request. The machine readable medium 504 also may include instructions to decrypt data being read from the memory by a memory request using a key bound to the valid CEP capability 522 matched by that memory request.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed:
1. A system comprising:
a global, non-volatile memory to store data accessible via capabilities;
a system processor to execute processes, the system processor comprising a central processing unit (CPU) associated with a first instruction set architecture (first ISA), the first ISA lacking instructions for capability-specific functionality;
a capability enforcement processor interposed between the global, non-volatile memory and the system processor; and
an associated memory coupled to the capability enforcement processor,
wherein the global, non-volatile memory is shared across the processes, across the system processor and the capability enforcement processor remotely, and the associated memory is remote from the system processor, and wherein the capability enforcement processor is configured to:

intercept a memory request from the system processor, wherein the memory request comprises an identifier corresponding with a virtual address space and the system processor, and enforce the memory request based on capability enforcement processor capabilities (CEP capabilities) maintained in a per-process capability space of the capability enforcement processor, wherein enforcing the memory request comprises identifying the per-process capability space based on a related context identifier associated with the memory request, wherein the capability enforcement processor exclusively enforces memory requests against a specific range of the associated memory and against a specific range of the global, non-volatile memory, and wherein the capability enforcement processor is a separate processor from the system processor, the capability enforcement processor associated with a second instruction set architecture (second ISA) comprising capability-specific instructions enabling capability-specific functionality independent of the first ISA of the system processor, such that the capability enforcement processor employs capabilities independent of the first ISA.

2. The system of claim 1, wherein to enforce the memory request, the capability enforcement processor is to:

compare the memory request against the CEP capabilities to determine if the memory request matches a valid CEP capability and if the memory request complies with permissions of the valid CEP capability; and permit the memory request via the valid CEP capability in response to a determination that the memory request matches a valid CEP capability and that the memory request complies with permissions of the valid CEP capability.

3. The system of claim 1, wherein:

the capability enforcement processor is a first capability enforcement processor; and the first capability enforcement processor is to pass the memory request to be handled by a second capability enforcement processor associated with a second memory to which the system processor is remote, in response to a determination that the memory request relates to a capability that is not maintained by the first capability enforcement processor and addresses the second memory to which the system processor is remote.

4. The system of claim 1, wherein the capability enforcement processor is among a plurality of capability enforcement processors including a first capability enforcement processor coupled to a first memory and a second capability enforcement processor coupled to a second memory;

the system processor is local to the first capability enforcement processor and the first memory; and the system processor is remote to the second capability enforcement processor and the second memory.

5. The system of claim 1, wherein the memory is a global memory including a plurality of partitions;

the capability enforcement processor is among a plurality of capability enforcement processors; and each capability enforcement processor of the plurality of capability enforcement processors is paired to a respective partition of the plurality of partitions to intercept memory requests addressing the respective partition, to maintain a CEP capability that references data or a capability in the respective partition, and to enforce an intercepted memory request against the CEP capability that references data or a capability in the respective partition.

6. The system of claim 1, wherein the capability enforcement processor is to encrypt data being written to the memory by the memory request using a key bound to the valid CEP capability matched by the memory request.

7. The system of claim 1, further comprising a trusted security base to program the capability enforcement processor with an initial capability to partition the global, non-volatile memory.

8. The system of claim 1, further comprising a trusted security base, wherein access to a management interface of the capability enforcement processor is restricted to the trusted security base.

9. A method comprising:

maintaining, by a capability enforcement processor interposed between a system processor and a global, non-volatile memory, the capability enforcement processor maintaining capability enforcement processor capabilities (CEP capabilities) in a per-process capability space, wherein the global, non-volatile memory is shared across the processes, across the system processor and the capability enforcement processor remotely, and an associated memory that is coupled to the capability enforcement processor, wherein the associated memory is remote from the system processor;

intercepting, by the capability enforcement processor, memory requests from the system processor, wherein the system processor comprises a central processing unit (CPU) associated with a first instruction set architecture (first ISA), wherein the first ISA lacks instructions for capability-specific functionality, and wherein each memory request of the memory requests comprises an identifier corresponding with a virtual address space and the system processor; and enforcing, by the capability enforcement processor, the memory request based on the CEP capabilities maintained in the per-process capability space, wherein enforcing the memory request comprises identifying the per-process capability space based on a related context identifier associated with the memory request, wherein the capability enforcement processor exclusively enforces memory requests against a specific range of the associated memory and against a specific range of the global, non-volatile memory, and wherein the capability enforcement processor is a separate processor from the system processor, the capability enforcement processor associated with a second instruction set architecture (second ISA) comprising capability-specific instructions enabling capability-specific functionality independent of the first ISA of the system processor, such that the capability enforcement processor employs capabilities independent of the first ISA.

10. The method of claim 9, wherein the enforcing comprises:

determining, by the capability enforcement processor, if the memory request matches a valid CEP capability among the CEP capabilities maintained in the per-process capability space and if the memory request complies with permissions of the valid CEP capability;

permitting, by the capability enforcement processor, the memory request in response to a determination, by the determining, that the memory request matches a valid CEP capability and that the memory request complies with permissions of the valid CEP capability; and issuing, by the capability enforcement processor, a memory protection exception in response to a determination, by the determining, that the memory request does not match a valid CEP capability or that the memory request violates permissions of the valid CEP capability.

11. The method of claim 10, further comprising:

responsive to a determination that the memory request relates to a capability that is not maintained by the capability enforcement processor and addresses a second memory to which the system processor is remote, passing the memory request to be handled by a capability enforcement processor associated with the second memory to which the system processor is remote; and responsive to a determination that the memory request relates to a capability that is not maintained by the capability enforcement processor and addresses the memory, copying a related master capability from the memory in to the per-process capability space as a CEP capability.

12. The method of claim 9, further comprising programming, by a trusted security base, the capability enforcement processor with an initial capability related to an initial partitioning of the global, non-volatile memory.

13. A non-transitory machine readable medium storing instructions executable by processing resource of a capability enforcement processor, wherein a global, non-volatile memory is shared across processes, across a system processor and the capability enforcement processor remotely, and an associated memory is remote from the system processor, wherein the global, non-volatile memory stores data accessible via capabilities, and the non-transitory machine readable medium comprising:

instructions to intercept memory requests from a system processor, wherein the system processor comprises a central processing unit (CPU) associated with a first instruction set architecture (first ISA), wherein the first ISA lacks instructions for capability-specific functionality, and wherein each memory request of the memory requests comprises an identifier corresponding with a virtual address space and the system processor;

instructions to identify a per-process capability space of the capability enforcement processor based on a context identifier associated with the memory request, the per-process capability space maintaining capability enforcement processor capabilities (CEP capabilities);

instructions to compare the memory request against the CEP capabilities in the identified per-process capability space of the capability enforcement processor to determine if the memory request matches a valid CEP capability among the CEP capabilities and if the memory request complies with permissions of the valid CEP capability; and instructions to permit the memory request in response to a determination that the memory request matches a valid CEP capability and that the memory request complies with permissions of the valid CEP capability, wherein the capability enforcement processor exclusively enforces memory requests against a specific range of the associated memory and against a specific range of the global, non-volatile memory, and wherein the capability enforcement processor is a separate processor from the system processor, the capability enforcement processor associated with a second instruction set architecture (second ISA) comprising capability-specific instructions enabling capability-specific functionality independent of the first ISA of the system processor, such that the capability enforcement processor employs capabilities independent of the first ISA.

14. The non-transitory machine readable medium of claim 13, further comprising instructions to respond to a determination that the memory request relates to a capability that is not maintained by the capability enforcement processor by copying a related master capability from the memory in to the per-process capability space as a CEP capability.

15. The non-transitory machine readable medium of claim 13, further comprising instructions to encrypt data being written to the memory by the memory request using a key bound to the valid CEP capability matched by the memory request.

* * * * *